United States Patent
Tilly (10) Patent No.: US 9,133,893 B2
(45) Date of Patent: Sep. 15, 2015

(54) CLUTCH ARRANGEMENT AND ACTUATION METHOD

(75) Inventor: Christian Tilly, Uhldingen-Muehlhofen (DE)

(73) Assignee: Kendrion Linnig GmbH, Markdorf (DE)

( * ) Notice: Subject to any disclaimer, the term of this patent is extended or adjusted under 35 U.S.C. 154(b) by 0 days.

(21) Appl. No.: 14/117,529

(22) PCT Filed: May 10, 2012

(86) PCT No.: PCT/EP2012/058609
§ 371 (c)(1),
(2), (4) Date: Mar. 28, 2014

(87) PCT Pub. No.: WO2012/156264
PCT Pub. Date: Nov. 22, 2012

(65) Prior Publication Data
US 2014/0216881 A1    Aug. 7, 2014

(30) Foreign Application Priority Data

May 13, 2011 (DE) .......... 10 2011 050 366

(51) Int. Cl.

| | |
|---|---|
| *F16D 27/112* | (2006.01) |
| *F16D 35/00* | (2006.01) |
| *F16D 21/00* | (2006.01) |
| *F16D 35/02* | (2006.01) |
| *F01P 5/04* | (2006.01) |
| *F04D 25/02* | (2006.01) |
| *F16D 47/06* | (2006.01) |

(Continued)

(52) U.S. Cl.
CPC . *F16D 21/00* (2013.01); *F01P 5/02* (2013.01); *F01P 5/043* (2013.01); *F01P 7/042* (2013.01); *F01P 7/046* (2013.01); *F04D 25/022* (2013.01); *F16D 27/112* (2013.01); *F16D 35/024* (2013.01); *F16D 35/028* (2013.01); *F16D 47/06* (2013.01)

(58) Field of Classification Search
CPC ....... F16D 29/00; F16D 35/02; F16D 35/024; F16D 35/028–35/029
USPC ...................... 192/48.2, 48.3, 57, 58.5, 58.61
See application file for complete search history.

(56) References Cited

U.S. PATENT DOCUMENTS

| | | |
|---|---|---|
| 4,305,491 A | 12/1981 | Rohrer |
| 4,926,992 A | 5/1990 | Linnig |

(Continued)

FOREIGN PATENT DOCUMENTS

| | | |
|---|---|---|
| DE | 3203143 C2 | 8/1983 |
| DE | 4207710 A1 | 9/1993 |

(Continued)

*Primary Examiner* — Rodney H Bonck
*Assistant Examiner* — Lillian Nguyen
(74) *Attorney, Agent, or Firm* — Bachman & LaPointe, PC (57) ABSTRACT

A clutch arrangement (1) for transmitting a drive torque from a drive shaft (2) to a secondary assembly, in particular to a fan wheel (11) of a motor vehicle, comprising a drive shaft (2), an output (10) and a friction disc clutch (12) which can be shifted by means of an electromagnetic arrangement (13). The clutch arrangement (1) comprises, in addition to the friction disc clutch (12) for transmitting torque from the drive shaft (2) to the output (10), a fluid friction clutch (4) whose hydraulic control valve (5) can be actuated by means of the electromagnetic arrangement (13) of the friction disc clutch (12) in order to set the slip.

14 Claims, 3 Drawing Sheets

(51) Int. Cl.
  *F01P 5/02* (2006.01)
  *F01P 7/04* (2006.01)

(56) References Cited

U.S. PATENT DOCUMENTS

| | | | |
|---|---|---|---|
| 5,879,259 | A | 3/1999 | Teraoka et al. |
| 6,056,098 | A | 5/2000 | Brown et al. |
| 6,247,567 | B1 * | 6/2001 | Watanabe ................ 192/58.43 |
| 6,732,845 | B2 | 5/2004 | Tilly et al. |
| 7,475,764 | B2 * | 1/2009 | Schultheiss et al. ........ 192/48.2 |
| 2009/0064946 | A1 * | 3/2009 | Schultheiss et al. ....... 123/41.11 |
| 2010/0163362 | A1 * | 7/2010 | Sixt et al. ................. 192/58.4 |
| 2012/0107145 | A1 * | 5/2012 | Roby ........................ 417/223 |

FOREIGN PATENT DOCUMENTS

| | | |
|---|---|---|
| DE | 19532128 A1 | 3/1997 |
| DE | 19742586 A1 | 4/1998 |
| DE | 69911479 T2 | 7/2004 |
| EP | 130024 A1 * | 1/1985 |
| EP | 0317703 A2 | 5/1989 |
| EP | 1248007 B1 | 10/2002 |
| JP | 54111027 A | 8/1979 |
| WO | 2004007923 A1 | 1/2004 |

\* cited by examiner

Fig. 4b

CLUTCH ARRANGEMENT AND ACTUATION METHOD

BACKGROUND OF THE INVENTION

The invention relates to a clutch arrangement for transmitting a drive torque from a drive shaft to an ancillary unit, in particular to a fan wheel, of a motor vehicle, comprising a drive shaft, an output, and a friction disc clutch which is able to be switched by means of an electromagnet arrangement. The invention further relates to an actuation method for actuating such a clutch arrangement.

Single-stage or multi-stage friction disc clutches are basically known for driving ancillary units such as fan wheels. Such friction disc clutches, constructed for example as clutches which are able to be activated electromagnetically, are described for example in EP 0 317 703 A2, DE 32 031 43 C2 and DE 42 07 710 A1. Reference is to be made to these publications with regard to the basic structure, the mode of operation and the field of use of such friction disc clutches. Friction disc clutches have no slip on engagement and therefore no differential rotation speed on the bearing site. It is also generally known that through the lack of rolling of the rolling bodies, this can lead to an increased abrasion and hence to an increased wear up to the possible failure of the bearing sites in field applications. In particular in the case of single-stage friction disc clutches, it is disadvantageous that in the engaged (coupled or respectively connected) state at high input rotation speeds these often provide undesirably high output rotation speeds and intensive switching jolts occur.

Instead of the previously described friction disc clutches, so-called fluid friction clutches, also designated as visco clutch or viscosity clutch, are used for the driving of ancillary units of motor vehicles. In visco clutches, a rotational movement is transferred from a primary side to a fluid, and then from the latter to a secondary side of the clutch. With regard to a possible structure of fluid friction clutches, reference is to be made to U.S. Pat. No. 4,305,491, EP 1 248 007 B1 and DE 699 11 479 T2. Most fluid friction clutches in commercial use comprise a hydraulic control valve, by which the slip of the fluid friction clutch is able to be set. In simple variant embodiments, the opening cross-section of the control valve is set via a temperature-detecting bimetal element. In addition, control vales constructed as an electromagnetic valve are known, which control the fluid flow between a storage chamber and a working chamber and therefore control the slip of the fluid friction clutch. Basically it is known to construct the hydraulic control valves as proportional valves or alternatively as discrete vales operated in a clocked manner, in which the through-flow quantity is dependent on the ratio of the opened time component to the closed time component of the armature.

In contrast to single-stage friction disc clutches, fluid friction clutches have a slow response behaviour and are afflicted by high slip values. Proceeding from the above-mentioned prior art, the invention is based on the problem of indicating an alternative clutch arrangement, which is distinguished by a smaller amount of wear of the friction disc clutch. In particular, the clutch arrangement is to manage with as few functional components as possible. In particular, the clutch arrangement is to be distinguished by being able to be actuated comfortably. Preferably, a variable speed adjustment is to be guaranteed over a large range, and also good damping characteristics and a quick response behaviour, preferably with full possibility for connection through. The problem further consists in indicating a simplified actuation method for such a clutch arrangement.

SUMMARY OF THE INVENTION

This problem is solved by a clutch arrangement in particular, in that the clutch arrangement in addition to the friction disc clutch for the torque transmission from the drive shaft to the output comprises a fluid friction clutch, the hydraulic control valve (electromagnetic valve) of which for the setting of the slip is able to be actuated by means of the electromagnet arrangement of the friction disc clutch.

Further advantages, features and details of the invention are indicated in the subclaims. All combinations of at least two of the features disclosed in the description, the claims and/or the figures fall within the scope of the invention. To avoid repetitions, features disclosed in terms of the device are also to be deemed to be disclosed and claimable in terms of the method. Likewise, features disclosed in terms of the method are also to be deemed to be disclosed and claimable in terms of the device.

The invention is based on the idea, in a clutch arrangement comprising an electromagnetically actuatable friction disc clutch and an electromagnetically actuatable fluid friction clutch (visco clutch), to associate with the friction disc clutch and the fluid friction clutch a shared electromagnet arrangement, by which both the friction disc clutch is able to be switched, i.e. able to be engaged or disengaged, and also the hydraulic control valve of the fluid friction clutch is able to be adjusted. In other words, in the clutch arrangement according to the invention an electromagnet arrangement is constructed and arranged such that the latter, preferably as a function of its effective current feed switches the friction disc clutch and actuates or respectively adjusts the hydraulic control valve of the fluid friction clutch, in order to therefore set the quantity of fluid, in particular quantity of oil, available for the torque transmission in the fluid friction clutch between the primary and secondary side of the fluid friction clutch. In other words again, a shared electromagnet arrangement is provided for the friction disc clutch and the fluid friction clutch, by which both an armature of the friction disc clutch and also an armature associated with the control valve of the fluid friction clutch is able to be actuated for the setting of the slip of the fluid friction clutch. According to a first embodiment, two magnetic flux circuits can be associated here with the electromagnet arrangement, or respectively are produced thereby, wherein a first flux circuit serves for the actuation of the armature of the friction disc clutch preferably constructed as a friction disc or carrying a friction disc, and the second magnetic flux circuit serves for the adjusting of the armature of the electromagnetically actuatable hydraulic control valve for setting the slip of the fluid friction clutch. By the provision of a shared electromagnet arrangement, a separate electromagnet arrangement for the separate switching or respectively actuation of the friction disc clutch and for the switching or respectively actuation of the fluid friction clutch can be dispensed with. Alternatively, an embodiment is able to be realized with a single magnetic circuit, particularly when for adjusting the hydraulic valve of the viscous clutch a revolving armature is provided, wherein with such an embodiment the magnetic circuit preferably runs firstly through the armature and the rotor of the friction disc clutch and then through the armature of the fluid friction clutch which is constructed in particular as a revolving armature. Of course, it is also possible to actuate differently constructed armatures, such as sliding armatures, with a single flux circuit. In the case of the realization of a single flux circuit, the latter must therefore bridge the air gaps or respectively working gaps of both armatures (friction disc clutch armature and visco clutch armature).

In addition to the above-mentioned dual function of the, preferably single, electromagnet arrangement of the clutch arrangement according to the invention, this has further advantages. Thus, the clutch arrangement according to the invention comprises, as previously mentioned, in addition to an electromagnetically actuatable friction disc clutch constructed in a single-stage or multi-stage manner, a fluid friction clutch in a shared drive train for an ancillary unit, in order to transmit the torque from the drive shaft to the ancillary unit, in particular a fan wheel of a motor vehicle, preferably for cooling the internal combustion engine. The invention therefore deliberately accepts a structure of a clutch arrangement which at first sight is more complex and more cost-intensive, in order to then surprisingly combine with one another the advantages of a friction disc clutch, known per se, on the one hand, and of a fluid friction clutch, known per se, on the other hand, wherein the structure which initially appears complex is embodied according to the invention in a substantially simplified and more favourably priced manner in that a shared electromagnetic clutch is provided for the actuation of the friction disc clutch and of the fluid friction clutch. By the combination of the friction disc clutch technology with the fluid friction technology in a shared clutch arrangement, a damped (gentle) engaging of the friction disc clutch can be realized, resulting in a smaller degree of wear of the friction disc clutch, in particular of the friction disc of the friction disc clutch. A further result of the combination of friction disc clutch and fluid friction clutch is a smaller degree of stress of a belt drive optionally provided at the output. Furthermore, owing to a possible closing off, the energy consumption can be reduced at high engine speeds. Also, owing to the combination, a damping of torsion vibrations is achieved, whereby the clutch arrangement according to the invention becomes crankshaft-compliant. Particularly preferably, the clutch arrangement is designed such that in a lower rotation speed range, preferably between approximately 10% and 85% of the maximum rotation speed, the ancillary unit is operated exclusively via the fluid friction clutch, wherein the transmitting torque is able to be modulated by a corresponding actuation of the hydraulic control valve with the shared electromagnet arrangement. The friction disc clutch can then be engaged when there is a greater requirement for cooling, wherein the friction disc clutch is distinguished by being able to be engaged quickly.

In further development of the invention, provision is advantageously made that the fluid friction clutch and the friction disc clutch are arranged in parallel, i.e. such that the flux of force on uncoupling (disengaging) of one of the two clutches in particular the friction disc clutch runs from the drive shaft to the output via the other clutch, in particular the fluid friction clutch. When the friction disc clutch is uncoupled from the output, the torque, with a preferably parallel arrangement, can therefore be transmitted exclusively via the fluid friction clutch from the drive shaft to the output. As mentioned in the introduction, the torque transmission takes place preferably exclusively via the fluid friction clutch in a lower load range or respectively rotation speed range, in particular when the maximum cooling load is not required.

Especially preferred is an advantageous embodiment of the invention, according to which the fluid friction clutch is able to be bridged by means of the friction disc clutch. In other words, the fluid friction clutch and the friction disc clutch are preferably arranged or respectively cooperate with one another such that with an engaged friction disc clutch a slip-free torque transmission is possible from the drive shaft to the output. Hereby the torque can be transmitted in a slip-free manner, which is advantageous in particular in the case of high cooling loads.

It is especially expedient if the output of the clutch arrangement is formed by the secondary side (output side) of the fluid friction clutch, or if the output of the clutch arrangement is coupled, i.e. operatively connected, preferably in a slip-free manner, in particular via an articulated shaft, with the secondary side of the fluid friction clutch. Preferably, the secondary side of the fluid friction clutch is mounted so as to be relatively rotatable to the drive shaft, wherein with disengaged friction disc clutch the torque is transmitted by means of the fluid friction clutch preferably exclusively via the fluid, in particular an oil, in the fluid friction clutch from the primary side to the secondary side, wherein, as mentioned in the introduction, the quantity of fluid available for torque transmission between secondary side and primary side is able to be set in a manner known per se via the hydraulic control valve, wherein, however, according to the invention the hydraulic control valve is able to be actuated by means of the shared electromagnet arrangement. The primary side of the fluid friction clutch is preferably connected permanently securely with the drive shaft. Especially preferably, the rotor of the fluid friction clutch is fixed at the free end of the drive shaft.

It is especially preferred if the secondary side of the fluid friction clutch is able to be connected via the friction disc clutch in a frictionally engaged, torque-transmitting manner with the drive shaft. Preferably for this, a rotor of the friction disc clutch is associated with the secondary side of the fluid friction clutch, wherein the secondary side of the fluid friction clutch is able to be connected with this rotor in particular via an axially adjustable armature in a frictionally engaged manner. In this case, in particular for the case of the construction of the friction disc clutch as a single-stage clutch, the fluid friction torque transmission mechanism of the fluid friction disc clutch is bridged, because the secondary side of the fluid friction clutch is driven directly by the friction disc clutch, which preferably, in particular in the case of the construction of the friction disc clutch as a single-stage clutch, rotates with the drive shaft rotation speed.

A variant embodiment is especially preferred, in which the rotor of the friction disc clutch is arranged axially between the shared electromagnet arrangement and the fluid friction clutch in particular of the secondary side of the fluid friction clutch, wherein the first magnetic flux circuit is introduced from the electromagnet arrangement into the rotor and (with sufficient effective current feed of the electromagnet arrangement) is guided via a gap, preferably filled with air (working air gap), to the armature which is connected with the secondary side of the fluid friction clutch. Preferably, at least two sections of the rotor, spaced apart in radial direction, are connected with one another here via a magnetic separation or respectively are magnetically separated, in order to prevent a magnetic short-circuit.

Particularly preferably in further development of the invention, provision is advantageously made that the previously mentioned armature of the friction disc clutch is fixed via return means, in particular a return spring, on the secondary side of the fluid friction clutch. It is particularly expedient if the return means is a spring, drawing the armature away, i.e. uncoupling, from the rotor in the direction of the secondary side of the fluid friction clutch, wherein it is of course also possible in an alternative variant embodiment to construct the spring as a pressure spring, in order to keep the friction disc clutch in this case closed in the state not supplied with current, i.e. engaged. The friction disc clutch can therefore be realized both as a clutch engaged in the state supplied with current and also alternatively disengaged in the state supplied with current, i.e. as a fail-safe clutch.

Various possibilities exist with regard to the embodiment of the armature of the friction disc clutch. According to a first, preferred alternative, the armature forms simultaneously directly a friction disc for the frictionally engaged cooperation with the rotor. In an alternative variant configuration, the armature carries a friction disc which is axially adjustable by means of the armature, in order to cooperate in a frictionally engaged manner with the rotor of the friction disc clutch.

It is particularly expedient if the friction disc clutch is constructed as a simple single-stage clutch, i.e. as a clutch which either transmits the full torque or no torque, wherein it is of course also possible to provide a two-, three- or multistage clutch as friction disc clutch, for example a friction disc clutch described in DE 20 2007 004 786 U1, wherein it is particularly expedient if in the case of the construction of the clutch as a multi-stage clutch eddy current means are provided for generating an eddy current for the purpose of entrainment or respectively of a coupling part, i.e. for generating a slip.

In order to be able to actuate the friction disc clutch and the fluid friction clutch optimally, i.e. preferably separately from one another by means of the electromagnet arrangement, provision is made in further development of the invention that the armature of the friction disc clutch is able to be switched by current feed of the electromagnet arrangement with a first current strength, that therefore on exceeding or falling below the first effective current strength (threshold value), the friction disc clutch is switched and that by current feed of the shared electromagnet arrangement with a second effective current strength different from the first current strength the armature of the hydraulic control valve of the fluid friction clutch is adjusted for setting the slip. It is particularly preferred if the through-flow quantity of the control valve is able to be set in a stepped or continuous manner, so that by a corresponding current feed of the electromagnet arrangement more than two different slip values of the fluid friction clutch are able to be realized. Basically, it is conceivable that the second effective current strength for setting a desired through-flow quantity through the control valve and hence for setting a fluid quantity available for torque transmission is greater than the first effective current strength. A variant embodiment is particularly preferred, however, in which the first current strength is greater, in particular distinctly greater, than the at least one second effective current strength, in order to thereby switch the friction disc clutch by current feed of the electromagnet arrangement in a first, in particular higher current feed range (current strength range), and by current feed in a second, preferably lower current feed range (current strength range) to set the fluid friction clutch, more precisely its hydraulic control valve, in order to thereby be able to set different through-flow quantities and hence slip values.

An effective current strength is understood to mean here the flux-relevant current strength, i.e. the current strength of the electromagnet arrangement current feed which is available for the generation of the magnetic field or respectively to which the generated magnetic field or respectively the generated magnetic flux is in a functional correlation. When the electromagnet arrangement is supplied for example with constant direct currents, then the effective current strength is to be understood as this respectively constant current strength (non-pulsed currents). When the current supply of the electromagnet arrangement is with a PWM signal, then the effective current strength is to be understood as the resulting or respectively mean current strength in a particular time interval, in particular in a period. As previously mentioned, it is particularly preferred if the fluid friction clutch does not know or respectively have exclusively two switching states, but rather if the through-flow quantity through the fluid friction clutch is able to be set in several stages or continuously, in order to enable a particularly good modulation of the slip of the fluid friction clutch. This can be realized in that the electromagnet arrangement is able to be supplied with different second effective current strengths from a second current feed range, which is preferably lower than a first current feed range, in which the first effective current strength (threshold value) is arranged for actuation of the friction disc clutch. The different effective current strengths can be set by supplying of current with different PWM duty factors or by differently high constant currents (non-pulsed currents). The PWM duty factor is understood to mean the relationship in a period between the time component in which the current is switched on to the time component in which the current is switched off. When the PWM frequency is e.g. 1 Hz, the time which is to be taken into account (period duration) is 1 s; 60% PWM then means 0.6 s current on and 0.4 s current off. When the frequency is 5 Hz, the time which is to be taken into account (period duration) is 0.2 s; 60% PWM means here 0.12 s current on and 0.08 s current off. The effective current strength is identical in the two above-mentioned examples, only the time basis, i.e. the period duration (time between two rising pulse edges) is different. The previously mentioned ways of power feed lend themselves for example when the hydraulic control valve is constructed as a so-called proportional valve, in which the through-flow quantity is set by means of the settable through-flow cross-section. For the case where the proportional valve has PWM supply, a comparatively high PWM frequency is to be selected, e.g. 400 Hz. In the case of the use of a so-called discrete valve as hydraulic control valve, i.e. of a (quick-alternating opening and closing) valve operated in a clocked manner, the current feed can take place alternatively by means of a constant current to be switched on and off (not pulsed) or by means of a PWM signal (pulsed current), wherein the PWM frequency is preferably low, e.g. 1 Hz.

As previously mentioned, it is conceivable that several effective (different) second current strengths for setting different through-flow quantities in the control valve are higher than a first effective current strength, in particular a threshold value for switching the friction disc clutch. However, a variant embodiment is preferred in which the first effective current strength, starting from the reaching of which the friction disc clutch is opened or closed, is greater than the previously mentioned second current strengths. In other words, the effective second effective current strengths for setting different through-flow quantities in the hydraulic control valve are arranged set up in a second current feed range, and the first effective current strength on the exceeding or falling below of which an actuation of the armature of the friction disc clutch results or respectively a switching of the friction disc clutch results in a first current feed range, wherein it is particularly preferred if the first current feed range (current strength range) is higher than the second current feed range.

A variant embodiment is particularly preferred in which the friction disc clutch is switched on reaching and exceeding the first effective current strength and with increasing effective second current strength or increasing duty factor of the electromagnet arrangement current feed, the slip of the fluid friction clutch increases. In other words, the slip is all the higher, the higher the second effect current strength is. In this variant, the concern is with a so-called fail-safe embodiment, because with the absence of current feed the maximum rotation speed possible with the visco clutch (least slip) is transferred. Alternatively, the control valve can be constructed and arranged so that the slip becomes all the greater, the lower the second effective current strength is.

It is particularly expedient if the hydraulic control valve of the fluid friction clutch on current feed of the electromagnet arrangement with (at least) the first effective current strength is closed.

As previously mentioned, different possibilities exist with regard to the generation of the first and second effective current strength. It is especially preferred to generate the different effective current strengths by means of different PWM signals or respectively with different duty factors by the use of PWM means. Alternatively, current circuit regulating means can be provided, by which more or less constant, i.e. non-pulsed, or respectively non-modulated currents are able to be provided.

Different possibilities exist with regard to the construction of the armature of the hydraulic control valve, which is adjustable by supplying of the electromagnet arrangement with at least one second effective current strength. It is thus conceivable to provide as armature an armature which is adjustable in a translatory manner, or a pivotable armature (tilting armature). It is also conceivable to provide a rotatably adjustable armature (rotating armature), which still further preferably is arranged in the drive shaft.

The invention also specifies a method for actuating a clutch arrangement according to the invention, which has previously been explained in detail. The method is distinguished in that this clutch arrangement, in addition to the friction disc clutch for the torque transmission from the drive shaft to the output, comprises a fluid friction clutch, the hydraulic control valve of which for setting the slip is actuated by means of the (shared) electromagnet arrangement for the friction disc clutch and the fluid friction clutch. Preferably, the actuation takes place, as previously explained in connection with the description of the device or respectively the arrangement, by feeding with different effective current strengths, in particular in order to switch the friction disc clutch by exceeding or falling below a first effective current strength and to set the through-flow quantity through the hydraulic control valve of the fluid friction clutch by feeding current with different duty factors, in order to therefore regulate the fluid quantity available for the torque transmission, in order to finally hereby influence the slip of the fluid friction clutch.

BRIEF DESCRIPTION OF THE DRAWINGS

Further advantages, features and details of the invention will emerge from the following description of preferred example embodiments and with the aid of the drawings.

These show in:

FIG. 4b: a sectional view along the section line A-A according to FIG. 4a.

DETAILED DESCRIPTION

In the Figures, identical elements and elements with the same function are marked by the same reference numbers.

Figure 1:
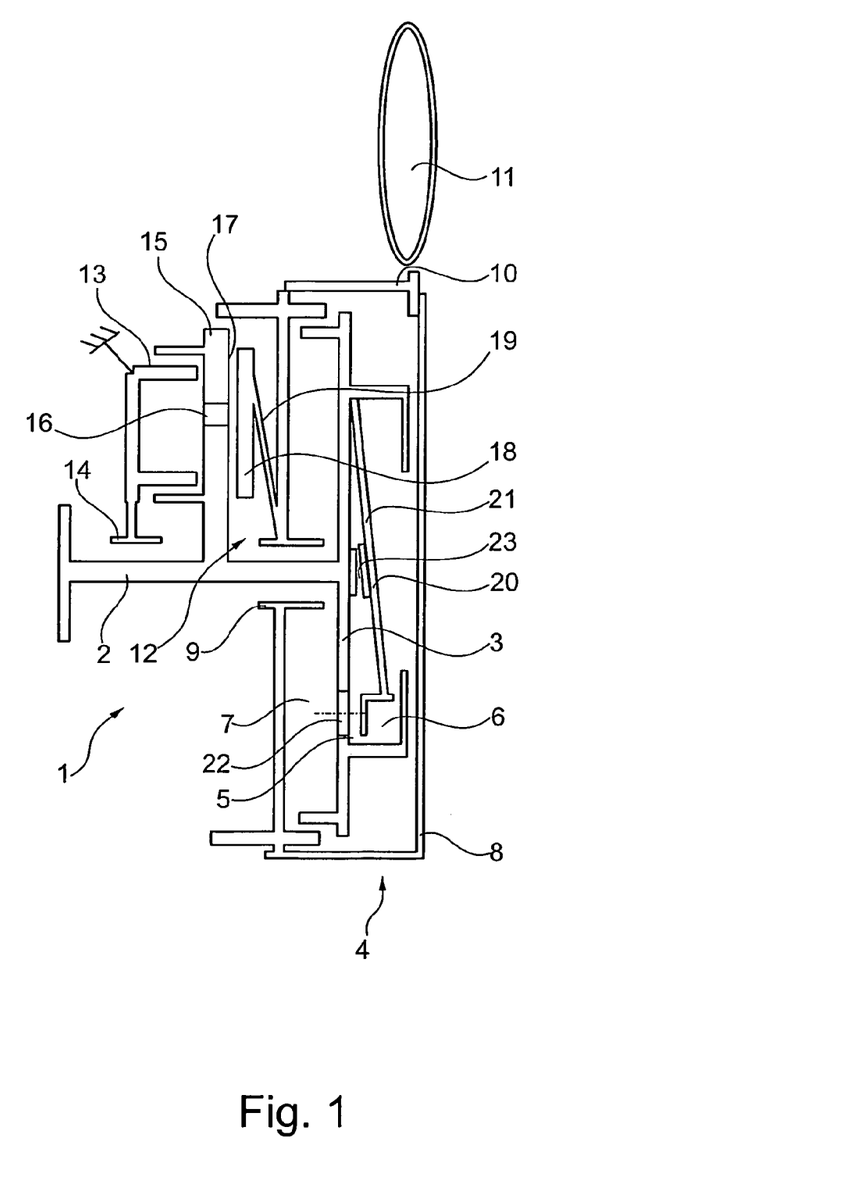
FIG. 1: a diagrammatic illustration of a clutch arrangement, which in addition to a single-stage (alternatively multi-stage) friction disc clutch constructed as an electromagnetic clutch, comprises a variable fluid friction clutch comprising an electromagnetically actuatable control valve, for the torque transmission of the torque from a drive shaft to an ancillary unit, here a fan wheel of an internal combustion engine cooling system, wherein the friction disc clutch and the fluid friction clutch are arranged in parallel.

In FIG. 1 an example embodiment of a clutch arrangement 1 is shown in highly diagrammatic form. This comprises a drive shaft 2, driven by an internal combustion engine which is not illustrated, at the free end of which drive shaft a primary part 3 (rotor, primary side) of a fluid friction clutch 4 (visco clutch) is secured in a torsionally rigid manner. The fluid friction clutch 4 comprises a hydraulic control valve 5, which serves for setting the slip of the fluid friction clutch 4. By means of the hydraulic control valve 5, the through-flow quantity or respectively the through-flow volume flow of fluid, in particular an oil, between a fluid storage chamber 6 and a working chamber 7 and via this the quantity of fluid available for the torque transmission in the working chamber 7 can be set. Between the working chamber 7 and the fluid reservoir 6, a generally known wiper- or pump element, which is not illustrated, is provided, which on rotation of the primary part 3 conveys the torque transmission fluid from the working chamber 7 back into the fluid storage chamber 6. By actuation of the hydraulic control valve 5, therefore as it were the return flow of fluid into the working chamber 7 and therefore the slip of the fluid friction clutch 4 is influenced.

In the working chamber 7 the fluid is situated between the primary part 3 (primary side) and a secondary part 8 (secondary side) of the fluid friction clutch and is sheared by rotation of the primary part 3, which rotates with the drive shaft rotation speed, and thereby transmits the torque to the secondary part 8, which follows behind the primary part 3 with slip.

The primary part 3 rotates, driven by the drive shaft 2 relative to the previously mentioned secondary part 8 of the fluid friction clutch 4, wherein the secondary part 8 is formed by a housing of the fluid friction clutch 4 which is mounted via a bearing 9 rotatably on the drive shaft 2. The torque transmission between the primary part 3 and the secondary part 8 takes place, as previously mentioned, via the fluid provided in the working chamber 7, wherein the fluid quantity available for the torque transmission in the working chamber 7 is able to be set in a controlled manner dependent on temperature by means of the hydraulic control valve 5.

In the example embodiment which is shown, the secondary side 8 (secondary part) of the fluid friction clutch 4 forms at the same time the (shared) output 10, wherein at the output 10 a diagrammatically indicated fan wheel 11 is provided. Instead of the provision of a fan wheel 11, the secondary side 8 can be connected, preferably in a slip-free manner, with an output, for example via an articulated shaft. It is also conceivable to provide as output for example a belt pulley, via which then by means of a belt drive an ancillary unit, for example a fan wheel, is able to be driven.

The clutch arrangement 1 further comprises a friction disc clutch 12, constructed as an electromagnetic clutch, which in the example embodiment which is shown is arranged parallel with the fluid friction clutch 4.

The clutch arrangement 1 comprises a stationary electromagnet arrangement 13 able to be supplied with current, which serves both for switching the friction disc clutch 12 and also for actuating the hydraulic control valve 5. The electromagnet arrangement 13 is rotatably mounted relative to the drive shaft 2 via a (further) bearing 14.

A rotor 15 of the friction disc clutch 12, connected in a torsionally rigid manner with the drive shaft 2, is arranged axially between the electromagnet arrangement 13 and the secondary part 8 of the fluid friction clutch 4, which rotor rotates with the drive shaft rotation speed. In the example embodiment which is shown, the rotor 15 overlaps the electromagnet arrangement 13 in axial direction, in order to thereby achieve an improved coupling in (feeding in) of the magnetic flux. A diagrammatically illustrated magnetic separation 16 can be seen in the form of a ring on a non-magnetic material, which forces the magnetic flux over a working air gap 17, if applicable filled with oil, into an armature 18 (armature disc) of the friction disc clutch 12. In the example embodiment which is shown, the armature 18 is securely connected via return means 19 in the form of a return spring with the secondary part 8 of the fluid friction clutch 4. The armature 18 can carry a friction disc (not illustrated) or can itself serve as a friction disc for frictionally engaged cooperation with the rotor 15 on current feeding of the electromagnet arrangement 13. When the armature 18 lies against the rotor 15 on current feeding of the electromagnet arrangement 13, the fluid friction torque transmission mechanism of the fluid friction clutch 4 or respectively the fluid friction clutch 4 is bridged, and the secondary side 8 of the fluid friction clutch 4 is driven by the rotation speed predetermined by the friction disc clutch 12, in the case of a single-stage clutch always the drive shaft rotation speed.

The clutch arrangement 1 which is shown is preferably operated such that in a lower output rotation speed range the friction disc clutch 12 is disengaged. In this state, the torque transmission takes place from the drive shaft 3 to the output 8 exclusively via the fluid friction clutch 4 by shearing of the fluid in the working chamber 7 of the fluid friction clutch 4 between primary part 3 and secondary part 8. The slip of the fluid friction clutch 4 is able to be set via the fluid quantity available for torque transmission in the working chamber 7, which in turn is able to be set via the hydraulic control valve 5, preferably in a temperature-dependent manner. With a higher cooling requirement, the friction disc clutch 12 can be engaged. In the example embodiment which is shown, for this the electromagnet arrangement, as will be further explained later, is supplied with at least a first effective current strength, whereby the armature 18 is adjusted contrary to the elastic force of the return means 19 axially against the rotor 15, and cooperates in a frictionally engaged manner therewith. In this operating state, the secondary side 8 of the fluid friction clutch 4 is driven with the rotation speed of the rotor 15 or if applicable with a lower rotation speed, if the friction disc clutch is constructed as a multi-stage clutch.

As can be seen in FIG. 1, the hydraulic control valve 5 comprises an armature 20, constructed here merely by way of example as a tilting armature which, in the example embodiment which is shown, is secured on the primary part 3 via a spring element 21 (return element). By feeding the electromagnet arrangement 13 with different effective second current strengths, in the control valve 5, constructed here as a switch valve (discrete valve) (alternatively as a proportional valve), different opening cross-sections of a fluid connection 22 (valve connection) can be set and therefore the fluid volume flow flowing back into the working chamber 7. The armature 20 is dimensioned or respectively designed here so that it can (already) be adjusted with smaller current feed strengths (current strengths) of the electromagnet arrangement 13 than the armature 20 of the friction disc clutch 12. For adjusting the armature 20 of the fluid friction clutch 4, the magnetic flux bridges a working gap 23, preferably filled with oil.

Figure 2:
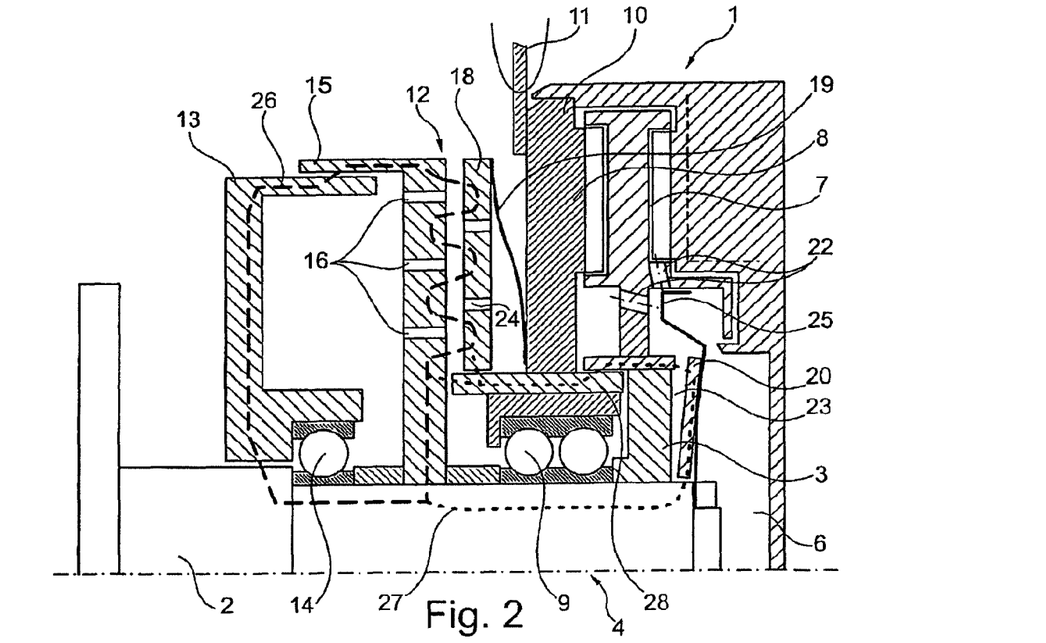
FIG. 2: a partial illustration of a possible variant embodiment of a clutch arrangement, wherein two magnetic flux circuits can be seen from the illustration, wherein a first flux circuit is comprised for actuation of an armature of a friction disc clutch and a second flux circuit for actuation of an armature of a hydraulic control valve of a fluid friction clutch.

In FIG. 2 a further variant embodiment of a clutch arrangement 1 is shown. This comprises a shared, fixedly arranged electromagnet arrangement 13, the coil of which is not illustrated for reasons of clarity. The electromagnet arrangement 13 is overlapped axially by the rotor 15 of the friction disc clutch 12, which comprises an axially adjustable armature 18. A plurality of magnetic separations 16, spaced apart in radial direction, are to be seen in the rotor 15, and magnetic separations 24 in the armature 18, in order to direct in a manner known per se the magnetic flux for intensifying the magnetic force to and fro several times between rotor 15 and armature 18 and in order to prevent a magnetic short-circuit. The rotor 15 sits in a rotationally rigid manner on the drive shaft 2, whereas the drive shaft 2 is rotatable relative to the electromagnet arrangement 13 via a bearing 14 constructed as a roller bearing. The armature 18 of the friction disc clutch 12 is secured via return means 19 on the secondary part 8 of the fluid friction clutch 4 and therefore on the output 10, which carries a fan wheel 11. The secondary part 8 is mounted rotatably relative to the drive shaft 2 via the (further) bearing 9 constructed as a roller bearing, whereas the primary part 3 of the fluid friction clutch 4 is secured in a torsionally rigid manner on the drive shaft 2.

The fluid friction clutch 4 comprises a hydraulic control valve 5, which is able to be actuated electromagnetically. For this, the hydraulic control valve 5 comprises a (control valve-) armature 20 for the actuation of a valve element 25 of the control valve 5, wherein the valve element 25 according to embodiment can also be formed directly by an armature 20 of the fluid friction clutch. In the example embodiment shown, the valve element 25 is constructed at the same time as a spring element or respectively return element.

By means of the control valve 5, the volume flow between a fluid storage chamber 6 and a working chamber 7 and therefore the slip of the fluid friction clutch can be set. By means of the valve element 25, the opening cross-section of at least one hereof two corresponding fluid connections 22 can be set. In the case of a discrete valve operating in a clocked manner, the fluid volume flow is not set by the free flow cross-section, but rather by the ratio of the "open" time component to the "closed" time component.

In the example embodiment which is shown, pumping means, known per se, for the conveying of fluid out from the working chamber 7 back into the fluid storage chamber 6 are not shown.

Two magnetic flux circuits can be seen from FIG. 2, namely a first magnetic flux circuit 26 and a second magnetic flux circuit 27.

The first magnetic flux circuit 26 forms the main flux circuit for switching the friction disc clutch 12, i.e. for actuating the armature 18, whereas the second magnetic flux circuit 27 forms an ancillary flux circuit and serves for setting the control valve 5. The first and second magnetic circuit 27 partially overlap one another. In a lower (second) current feed range, primarily the second magnetic flux circuit 27 is relevant, because the control valve 5 is designed such that also comparatively low effective second current strengths are sufficient to adjust the armature 18 of the fluid friction clutch 4. The magnetic flux 27 runs here from the electromagnet arrangement 13 via rotor 15 and armature 18 through flux-conducting components 28 up to an axially spaced working air gap 23 of the fluid friction clutch 4. In order to prevent a magnetic short-circuit or respectively in order to direct the magnetic flux to the armature 20 of the fluid friction clutch 4 and then via the drive shaft 2 back to the electromagnet arrangement 13, the materials of the different constituents or respectively components of the clutch arrangement coming into use are selected so that the magnetic flux is directed in a targeted manner. In the example embodiment according to FIG. 1 (likewise in the example embodiment according to FIGS. 4a and 4b which is to be subsequently further explained), non-ferritic materials, such as for example aluminium, are provided with hatchings rising to the right, whereas the components or respectively constituents with the hatchings rising to the left are constructed from ferritic material, e.g. steel, in order to direct the flux through the last-mentioned constituents in a targeted manner. The working air gap 23 is bridged and the magnetic flux in the second flux circuit 27 runs back to the electromagnet arrangement here via the drive shaft 2.

When the electromagnet arrangement 13 is supplied with a first effective current strength or higher, which is preferably higher than the second effective current strengths, the first magnetic flux circuit 26 comes into effect. The generated magnetic force is now sufficient in order to adjust the armature 18 and to engage the friction disc clutch 12, so that in the arrangement according to FIG. 2 the fluid friction clutch is, as it were, bridged. On supplying with the effective first current strength, the fluid connections 22 are substantially closed, so that the fluid friction clutch 4 would actually run with maximum slip which, however, substantially does not come into effect, because the secondary part 8 of the fluid friction clutch 4 is rotated by the friction disc clutch with the drive shaft rotation speed.

Figure 3:
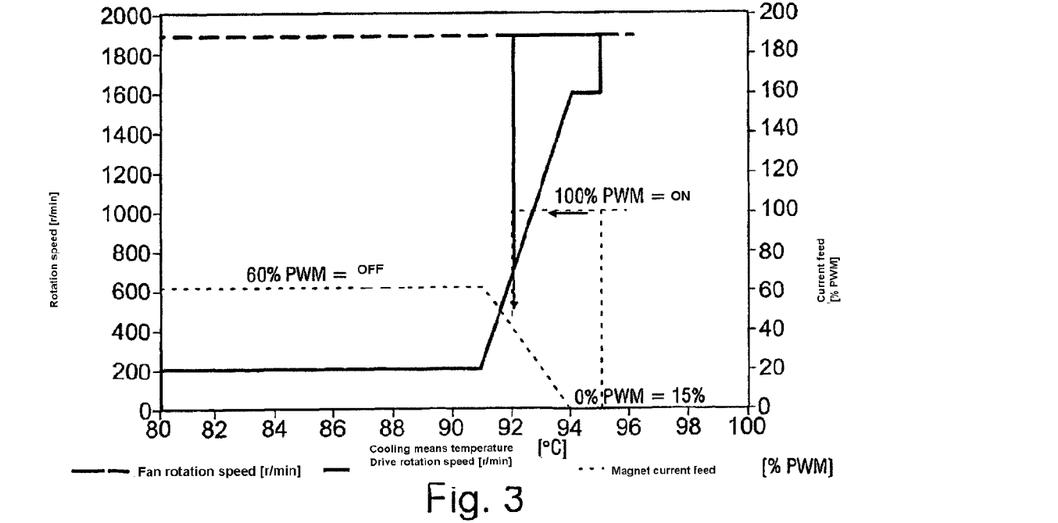
FIG. 3: a diagram for a possible actuation of a clutch arrangement with a shared electromagnet arrangement for the friction disc clutch and the fluid friction clutch.

In FIG. 3 an actuation possibility is shown of a clutch arrangement 1, shown by way of example in FIG. 2. From the left vertical axis, the number of revolutions of the drive shaft is plotted, on the lower horizontal axis the cooling means temperature of a cooler which is to be cooled by means of a fan wheel, and on the right vertical axis the effective current feed, indicated here in percent PWM (ratio of the time component "current on" to time component "current off" in a period), wherein 100% PWM indicates the maximum current feed.

Firstly, the temperature of the cooling means is still low. Up to a temperature, selected by way of example, of 91° C. exclusively the fluid friction clutch 6 is operated, and namely with maximum slip. This is achieved in that the current feed is supplied with 60% of the maximum current strength, here with 60% PWM. In this state, the fluid volume flow from the fluid storage chamber 6 into the working chamber 7 is minimal, for example if in the case of a proportional control valve the corresponding fluid connection is closed or minimized. In the case of a discrete valve, this is preferably closed. It is now assumed that the temperature of the cooling means rises further, here initially up to 94° C., wherein these changes in state are counteracted by the electromagnet arrangement now being supplied with an increasingly lower second effective current strength or respectively with a second effective current strength becoming less here. The current feed is even reduced from 60% PWM to 0% PWM. Hereby, the fluid connection into the working chamber is opened further and the fluid volume flow from the fluid storage chamber into the working chamber increases, and hence the fluid quantity available for the torque transmission in the working chamber, which in turn leads to a reduced slip and therefore to an increased rotation speed of the fan wheel. This increases from the initially constant 200 revolutions per minute to, in the example which is shown, 1600 revolutions per minute.

In the example embodiment which is shown, it is now assumed that despite the increased fan wheel rotation speed of 1600 revolutions per minute, the temperature of the cooling means rises further and namely from 94° C. to 95° C. In order to counteract the further temperature increase, on reaching a temperature of 95° C. the electromagnet arrangement is supplied with maximum current feed, here 100% PWM, so that an effective first current strength of for example 80% PWM is reached and is even exceeded and subsequently the friction disc clutch is engaged. Hereby, the fluid friction clutch is now bridged and the fan wheel is operated with the drive shaft rotation speed. In the example embodiment it is now further assumed that owing to this maximum operating rotation speed of 1900 revolutions per minute here, the temperature of the cooling means drops. The corresponding hysteresis accumulation can be seen in FIG. 3. On reaching a cooling means temperature of 92° C., the current feed of the electromagnet arrangement is reduced owing to a corresponding stored characteristic map in the control means, which are not shown, or respectively PWM current feed means, to 40% PWM here, i.e. to a second effective current strength set up in a second current feed range, whereby then subsequently the fan wheel is only operated with 700 revolutions per minute. The current feed with the second effective current strength, which is lower than the threshold value for switching the friction disc clutch or respectively the armature of the friction disc clutch, the friction disc clutch is disengaged and in the example embodiment according to FIG. 2 the output is driven exclusively via the shearing of the fluid in the fluid friction clutch 4.

Figure 4A:
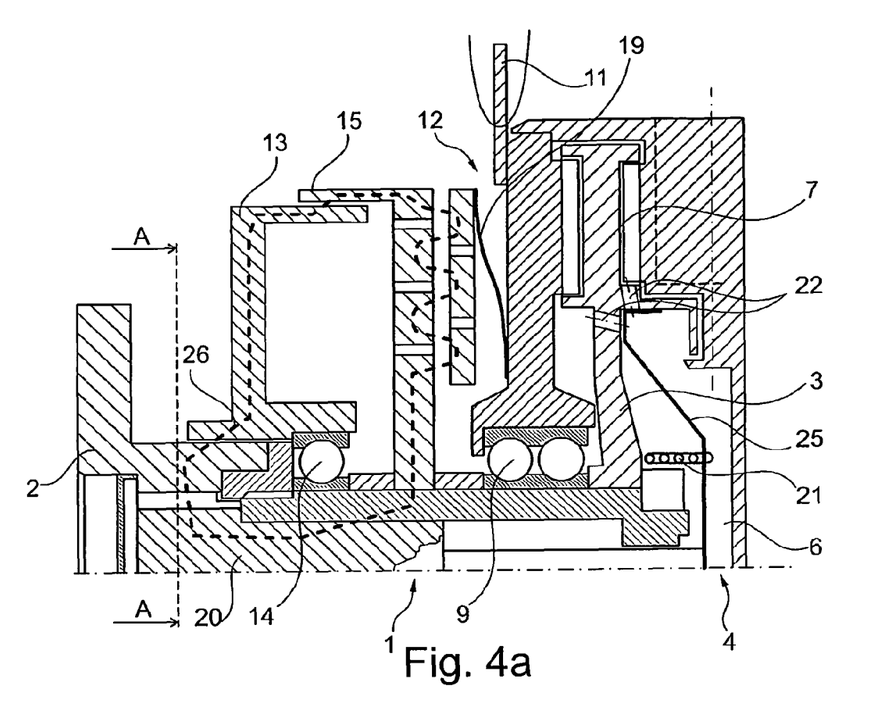
FIG. 4a: a partial illustration of a possible variant embodiment of a clutch arrangement, wherein as armature for the actuating of the hydraulic control value of the fluid friction clutch a revolving armature (rotating armature) is provided, which according to a preferred embodiment is arranged in the drive shaft.
Figure 4B:
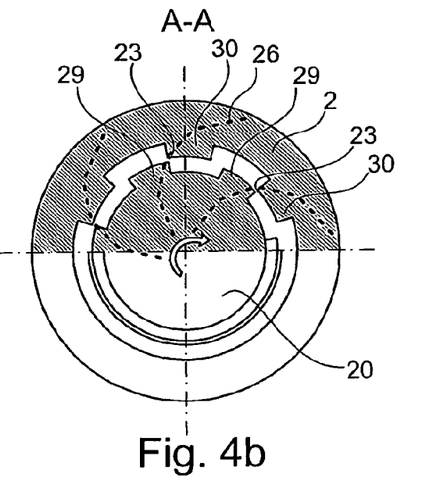

The clutch arrangement 1 illustrated partially in FIGS. 4a and 4b, in analogous manner to the example embodiment according to FIG. 2, comprises a friction disc clutch 12 with an armature 18 which is able to be adjusted in a translatory manner. Associated with the latter is a fixedly arranged electromagnet arrangement 13, the coil of which is not illustrated for reasons of clarity, as in the preceding example embodiments. The electromagnet arrangement 13 is overlapped axially by the rotor 15 of the friction disc clutch. With regard to the structure of the friction disc clutch 12 and with regard to the further commonalities, reference is to be made to the example embodiment according to FIG. 2, to avoid repetitions.

As can be seen from FIG. 4a, the electromagnet arrangement 13 is associated not only with the armature 18 of the friction disc clutch 12, but also with an armature 20, constructed here, however, as a revolving armature (rotating armature), of a fluid friction clutch 4. In contrast to the example embodiment according to FIG. 2, a single magnet flux circuit 26 is sufficient, which proceeding from the single electromagnet arrangement initially runs through the friction disc clutch 12, more precisely the rotor 15 thereof, and the armature 18 and then is closed via the armature 20. This armature 20, constructed, as mentioned, as a revolving armature, is part of the drive shaft 2 or respectively is arranged in the drive shaft 2 which is constructed as a hollow shaft. The armature 20 of the fluid friction clutch 4 rotates during operation together with the drive shaft 2, can, however, as a function of the current feed of the electromagnet arrangement 13, be turned relative to the latter. Through this relative rotational movement, a valve element 25 of the hydraulic control valve 5 of the fluid friction disc clutch 4 can be turned relative to at least one fluid connection 22, wherein hereby the fluid quantity in the working chamber 7 is influenced. For this, the armature 20 is constructed so as to be elongated axially and extends beyond the right end of the drive shaft 2 of the plane of the drawing and is connected with the valve element 25 in a torsionally rigid manner within the fluid storage chamber 6. For returning the armature 20, which is constructed as a revolving armature, a spring element 21 is provided, which counteracts the rotary movement of the valve element 25 caused by current feed of the electromagnet arrangement 13.

In the variant embodiment of the clutch arrangement 1 according to FIGS. 4*a* and 4*b*, the working gap 23 is arranged or respectively formed between radial extensions 29 of the armature 20 and radial extensions 30 of the drive shaft 2 directed in opposition, i.e. radially inwards.

When the electromagnet arrangement 13 is fed with a first effective current strength or higher, which is preferably higher than the second effective current strengths, the armature 18 of the friction disc clutch 12 is adjusted, whereby the fluid friction clutch 4 is bridged. On feeding with second current strengths, i.e. in a second current feed range, the position of the armature 20, constructed as a revolving armature, can be influenced, and consequently the rotation position of the valve element 25 relative to the fluid connections 22. Hereby, the return flow quantity of the fluid available for torque transmission into the working chamber 7 and hence the slip of the fluid friction clutch 4 is set. The slip is therefore dependent on the rotation angle of the armature 20 relative to the drive shaft 2.

The invention claimed is:

1. A clutch arrangement for transmitting a drive torque from a drive shaft to an ancillary unit of a motor vehicle, comprising the drive shaft, an output and a friction disc clutch which is able to be switched by an electromagnet arrangement, the clutch arrangement in addition to the friction disc clutch for torque transmission from the drive shaft to the output comprises a fluid friction clutch having a hydraulic control valve for setting slip of the fluid friction clutch, wherein the hydraulic control valve is able to be actuated by the electromagnet arrangement of the friction disc clutch.

2. The clutch arrangement according to claim 1, wherein the friction disc clutch and the fluid friction clutch are arranged in parallel, so that when the friction disc clutch is disengaged, torque transmission is possible from the drive shaft to the output exclusively via the fluid friction clutch.

3. The clutch arrangement according to claim 2, wherein the fluid friction clutch is bridged by the friction disc clutch, so that a torque transmission is possible in a slip-free manner from the drive shaft to the output.

4. The clutch arrangement according to claim 1, wherein the output is formed by a secondary side of the fluid friction clutch in a slip-free manner.

5. The clutch arrangement according to claim 4, wherein, when the friction disc clutch is engaged, the secondary side of the fluid friction clutch is connected in a torsionally rigid manner via the friction disc clutch in a torque-transmitting manner with the drive shaft.

6. The clutch arrangement according to claim 5, wherein the secondary side of the fluid friction clutch carries an armature of the friction disc clutch and return spring for the armature.

7. The clutch arrangement according to claim 1, wherein the friction disc clutch and the fluid friction clutch are constructed such that when the electromagnet arrangement has a first effective current strength, the friction disc clutch is able to be switched active and when the electromagnetic arrangement has a second effective current strength, different from the first current strength and lower than the first current strength, the control valve of the fluid friction clutch is able to be actuated.

8. The clutch arrangement according to claim 7, wherein the electromagnet arrangement is able to be fed with different second effective current strengths from a second current feed range for setting different slip values and/or wherein the electromagnet arrangement is able to be fed by different duty factors with second effective current strengths for setting different slip values.

9. The clutch arrangement according to claim 8, wherein the at least one effective second current strength of the second current feed range is lower than the first effective current strength, associated with a first current feed range, for activating the friction disc clutch.

10. The clutch arrangement according to claim 9, wherein the hydraulic control valve is constructed and able to be actuated such that with increasing effective second current strength and/or a duty factor becoming greater, the slip of the fluid friction clutch increases.

11. The clutch arrangement according to claim 7, wherein the control valve of the fluid friction clutch is closed or alternatively completely opened on feeding of the electromagnet arrangement with the first effective current strength.

12. The clutch arrangement according to claim 7, wherein for feeding the electromagnet arrangement with the first and second effective current strength, PWM means or current control circuit means are provided.

13. The clutch arrangement according to claim 7, wherein an armature of the control valve of the fluid friction clutch, adjustable by feeding of the electromagnet arrangement with the second effective current strength, is (a) a revolving armature arranged in the drive shaft, or (b) a tilting armature or an armature which is able to be adjusted in a translatory manner.

14. A method for actuating a clutch arrangement for transmitting a drive torque from a drive shaft to an ancillary unit, comprising the drive shaft, an output, and a friction disc clutch able to be switched by an electromagnet arrangement, comprising the steps of:
  providing the clutch arrangement, in addition to the friction disc clutch for torque transmission from the drive shaft to the output, with a fluid friction clutch having a hydraulic control valve for setting slip of the fluid friction clutch, and actuating the control valve by the electromagnet arrangement of the friction disc clutch.

* * * * *